United States Patent [19]

Schäfer

[11] Patent Number: 4,697,294

[45] Date of Patent: Oct. 6, 1987

[54] SPEED BUMPS FOR ROADWAYS

[76] Inventor: Hartmut Schäfer, Ringstrasse 2, 5000 Cologne 50, Fed. Rep. of Germany

[21] Appl. No.: 778,511

[22] Filed: Sep. 20, 1985

[30] Foreign Application Priority Data

Sep. 21, 1984 [DE] Fed. Rep. of Germany ... 8427790[U]

[51] Int. Cl.$^4$ .................. E01D 1/00; E01F 13/00
[52] U.S. Cl. .................................. 14/69.5; 404/16; 404/35; 404/40
[58] Field of Search .......................... 404/9–16, 404/35, 40, 41, 43, 39, 45, 1, 71; 14/69.5, 71.1; 238/8; 52/584, 582, 410; 254/88

[56] References Cited

U.S. PATENT DOCUMENTS

| 644,138 | 2/1900 | Ketchum | 52/584 |
|---|---|---|---|
| 4,430,837 | 2/1984 | Kirschenbaum | 404/40 |
| 4,468,910 | 9/1984 | Morrison | 404/39 |
| 4,577,448 | 3/1986 | Howorth | 404/40 |

FOREIGN PATENT DOCUMENTS

| 48409 | 9/1984 | European Pat. Off. | 404/9 |
|---|---|---|---|
| 225807 | 7/1925 | United Kingdom | 404/45 |
| 689791 | 4/1953 | United Kingdom | 404/15 |
| 1147694 | 4/1969 | United Kingdom | 404/1 |
| 2030197 | 4/1980 | United Kingdom | 404/15 |
| 2036140 | 6/1980 | United Kingdom | 404/15 |

Primary Examiner—Stephen J. Novosad
Assistant Examiner—Bruce M. Kisliuk
Attorney, Agent, or Firm—Steele, Gould & Fried

[57] ABSTRACT

A resilient ramp structure for highways, especially useful as a highway speed bump has at least two ramp plates fixable to a highway surface. Each ramp plate has an inclined surface leading to a level platform surface which can be abutted against another such plate or to a flat platform plate. In the ramp plate, the inclined and platform sections are formed integrally. A reinforcing strip runs along the inclined portion of the ramp plate and receives screws to be affixed in the underlying material. Junctions between abutting ramp and/or platform plates are secured by pressure plates that are disposed in recesses at the corners of the plates and hold each adjacent plate to the underlying material.

20 Claims, 6 Drawing Figures

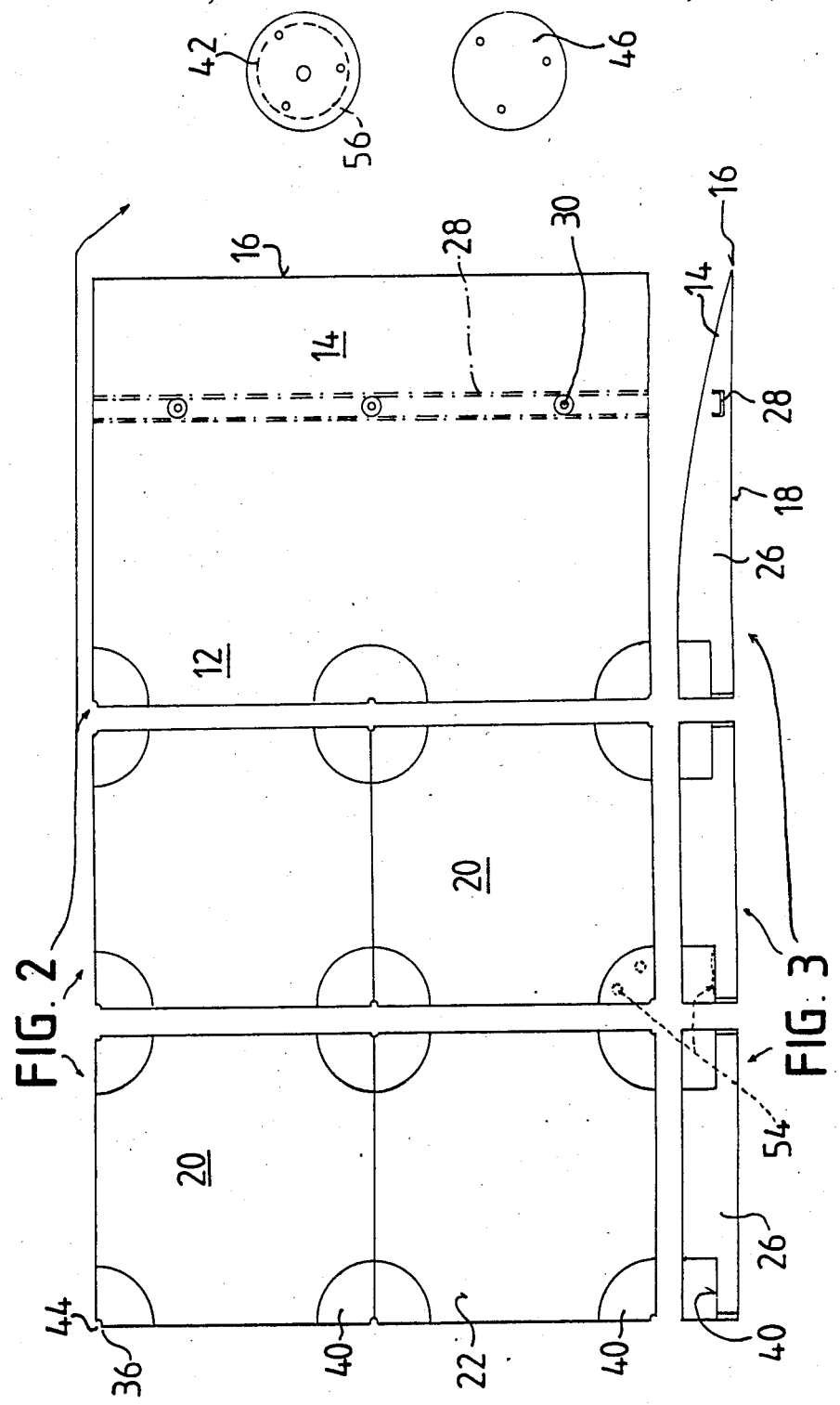

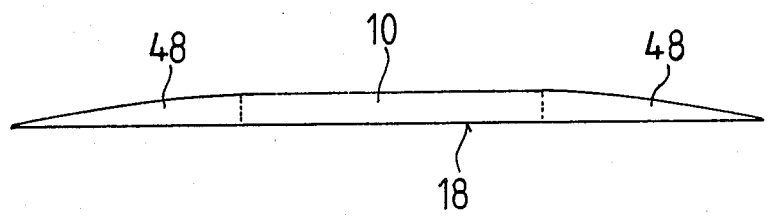
FIG. 5
FIG. 4
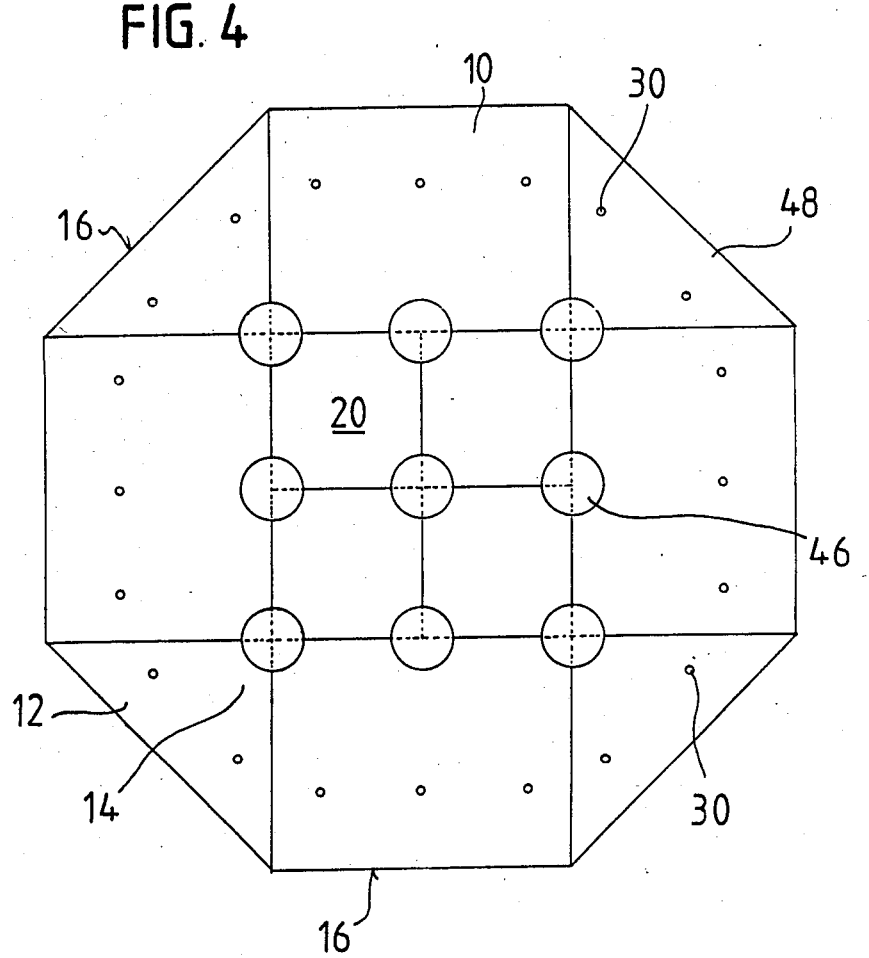

SPEED BUMPS FOR ROADWAYS

1. Field of the Invention

This invention concerns vehicle-traversed structures for highways, and in particular a highway speed bump. At least two ramp plates which are essentially prismatic and flat on their bottoms, have a flat level upper part adjoining a blunt edge on one side to be abutted against another plate, and adjoining an inclined wedge or ramp area on an opposite side, leading from the level part to a base surface such as a highway surface. Each ramp plate is an integral piece including the level upper part and the wedge area is one piece. Spacing plates can be located between ramp plates, the spacing plates each having a flat upper surface for extending the level upper surface defined by the ramp plates, and blunt edges to be abutted against the ramp plates or against other spacing plates. The plates can be connected to one another at their abutting edges and to the base surface at structures provided in the wedge areas.

2. Prior Art

Highway speed bumps as known in the art are ridges laterally crossing roadways. The bumps define a change in traffic elevation, for example connecting a high level at a sidewalk to a high level at a traffic island or the like, and leading to the lower level of the roadway. Surface changes may also be defined along a roadway, for example in which the traffic level is raised to the level of the sidewalk for a certain distance, and then lowered back to the usual traffic level. Such bump and ramp structures are optical speed limiters (i.e, drivers see them and slow down), and also have a dynamic effect on the driver and vehicle. These structures define traversable obstacles that encourage reduced speed or forceably limit speed. Being forced to proceed at a restricted speed (e.g., no more than 30 km per hour), the driver is caused to pay attention to special situations in a given area.

Inasmuch as raised speed bump structures of this kind have the effect of reducing vehicle speed, they are used primarily to moderate the speed of traffic in residential areas. Speed bumps are probably the most effective means for assuring reduced speeds in residential zones. (According to statistics of the Federal Republic of Germany, most accidents are the result of excess speed in residential zones.)

Speed bump structures are also versatile and have many other applications in which traffic safety is increased similar to the situation in residential zones. These raised structures can be used at various points of possible conflict between motorized traffic and pedestrians, for example in the areas of schools, nursery schools, churches, hospitals and the like, and at pedestrian crossings and bicycle paths. It is also possible to integrate bicycle paths and pedestrian crossings into raised speed bumps, and thereby to improve the safety of persons at crossings and junction areas, which are subject to accidents. Examples are entrances to residential areas, pedestrian crossings and the like. These structures can also be used around construction sites, as traffic islands, and as dividers for separating or narrowing traffic lanes, in these cases running longitudinally with the direction of traffic.

Speed bumps, with their well-known effect of slowing down traffic, also reduce the temptation of drivers to use residential streets as short cuts. The speed bumps therefore become traversable obstacles that resist increased traffic, but do not destroy the interconnection of thoroughfares. Accordingly, expensive and inconvenient highway constructions and configurations such as looped streets, dead ends and the like are unnecessary.

Known speed bumps for motor vehicles are made of asphalt or concrete, and lack any real elasticity. A vehicle encountering a speed bump experiences a pronounced bumping sensation when a wheel passes over leading and trailing edges and changes in elevation. The bump is not only experienced in the vehicle, but also causes emission of noise into the surrounding area. At times, for example when a driver is surprised and proceeds too fast over a bump, the stability of the motor vehicle is impaired. There may be damage to the vehicle, for example parts of the exhaust system may be torn off. These rigid conventional speed bumps are uncomfortable and irritating, which itself may trigger an aggressive response in the driver and may decrease his patience with respect to the situation in the residential area or the like that was thought to justify measures to reduce traffic speed.

SUMMARY OF THE INVENTION

It is an object of the invention to improve and develop the basic speed bump so that it can be moved quickly, causes less noise and damage, and is more effective for its general objects.

The objects of the invention are achieved by use of modular speed bumps as described herein, made of an elastic material such as rubber, preferably recycled rubber. The speed bumps include ramp plates, each ramp plate being an integral piece including a wedge section with an incline, and a platform at the top of the incline. Parallel to the leading (or trailing) edge of the inclined ramp a rigid reinforcement strip, for example a steel channel section, is embedded in the elastic material. The reinforcement strip extends substantially along the complete wedge edge, and has a number of screw holes for fastening the ramp to the underlying roadway material. The ramp plates are attachable to spacer plates defining a level platform surface at the same height as the platform part of the ramp plates.

A speed bump made of energy-absorbing material deforms elastically when driven over. Accordingly, the destructive impact energy of the vehicle is greatly absorbed, but the object of reducing vehicle speed is maintained. Furthermore, impairment of driving stability and damage to the motor vehicle is substantially eliminated. Therefore, unlike rigid concrete bumps and the like, if necessary emergency vehicles such as fire trucks, ambulances and the like can traverse the resilient speed bump of the invention at relatively high speeds, without grave danger. With the device of the invention, driving stability is only significantly impaired at very high speeds.

When crossing conventional rigid inclined ramp speed bumps, to avoid damage and loss of stability, drivers often undertake a sudden deceleration immediately before the speed bump. With the invention, however, an area with one or more ramps can be passed easily at a steady reduced speed. Accordingly, the driver passes through the residential area or the like with his attention centered on the special situation in the area requiring reduced speed, rather than centering attention on sudden braking and acceleration movements to deal with speed bumps.

The energy absorbing material of the invention is also unlike known rigid bumps in that noise is reduced. With the resilient inclined ramp speed bump of the invention, less power is transferred to the vehicle, reducing vehicle noise, and less noise is emitted into the area. The lack of sudden braking and acceleration resulting from the passage at more constant speeds also eliminates engine noise.

The device of the invention has the advantages of quick portability and assembly. An inclined ramp speed bump according to the invention can be set up and assembled for a two lane street in a single day. Therefore, traffic obstruction time is sustantially reduced. Construction time for a regular rigid paved ramp may be eight to ten days, obstructing traffic for a longer time. The device of the invention is also much less expensive and requires less equipment to install or remove. With these advantages of material and construction, the invention is well suited for temporary installations, test installations and the like.

A great advantage of the invention is that the assembly and disassembly of a speed bump can be accomplished very fast. With disassembly the individual elements can be removed without damage and accordingly are reusable. The rigid base surface of the roadway, on which the ramp has been mounted, is not changed as usually occurs with conventional rigid constructions. With the invention only drill holes of relatively small diameter are made for installing fasteners for receiving screws, and these holes can be later filled with sealing compound. The invention is nevertheless durable and can survive passage of a vehicle weighing as much as 55 tons.

An important advantage of the invention is that is it universally applicable to any dimensions. By means of the modular building block system of the invention, it is possible to adapt the device by connection of parts to cover practically any two dimensional configuration.

As described above, the speed bump of the invention is plainly in view of the driver, being exposed at least along the full length of the incline ramp and over its sloping wedge section from the leading edge up to the platform section. The approaching driver also sees the length of the speed bump in the direction of travel.

According to the invention, the dynamic inclined ramp is constructed by using ramp plates having wedge portions leading integrally to platform portions, and if necessary, also using spacer plates that extend the ramp plates at the height of their platform sections. In some instances, other plate configurations are used. The sections are connected in a modular building block manner from already-constructed plates. Inclined ramps of regular dimensions can be fully assembled on location by choice and connection of building blocks. Preferably, the bottoms of the ramp plates and spacer plates are rectangular. The spacer plates are preferably square. For special applications, for example traffic islands, the edges of the ramp plates can be made to define any desired pattern. It is thereby possible even to construct rounded traffic islands. Should any of the individual plates become damaged, the building block system also allows the individual plates to be easily and quickly replaced, being only fastened with screws, and being removable without disturbing adjoining plates.

In a preferred embodiment, the ramp plates are shaped such that the sloping wedge section passes smoothly into the flat platform section integral therewith. The smooth transition reduces the transfer of force to the vehicle as the rolling wheel moves up to the platform height, or moves off of the platform height when leaving the ramp plate. Near the leading edge of the ramp plate, the angle of incline can be made lower, and curved more steeply upwardly at a distance from the leading edge, etc.

The length of the platform section of the preferred ramp plate is 10 to 80 percent, and preferably 50 percent, of the length of the wedge section, measured in the direction of travel. The ramp plates are accordingly not simply leading and trailing slope parts of triangular section approaching a platform defined by spacer plates. The ramp plates each integrally encompass both a platform section with a flat driving surface and an inclined section. It is therefore possible to construct a dynamic speed bump using only ramp plates (i.e., back to back ramp plates without spacer platform plates), without creating a sharp ridge subject to impact. With back to back ramp plates the platform sections of the two ramp plates define a level, flat upper surface for the speed bump.

According to the invention, the critical transition area between the leading or trailing slope and the flat upper surface is confined to a single integral element, namely the ramp plate. Accordingly, loads which arise due to the change in inclination, which could lead to a separation of individual plates from one another, are borne by the ramp plates and do not lead to such separation.

The angle of the wedge section of the ramp plate is preferably between 5 and 15 degrees to horizontal, and especially between 7 and 11 degrees. This is a relatively flat slope that allows vehicles to drive on or off the ramp without danger or difficulty, even at rather high speeds. Accordingly, the inclined ramp speed bump is noticed by the driver as intended, but dangerous traffic situations are not created.

In a particularly preferred embodiment, a reflector is embedded in the ramp plate in the driving surface of the wedge area. A reflective foil can be vulcanized directly into the driving surface. In this way the presence and width of the ramp is made known to the driver, even in the dark. Reflection areas on the wedge area according to the invention can include reflectors, may contain a reflective foil, or may be other types. Reflective foil has proved especially successful, with some light being reflected in all directions, including into the normal line of sight of the driver.

In another preferred embodiment, recesses are formed at corners of the ramp plates on a side opposite from the inclined ramp area. Similar recesses are formed on abutting corners of spacer plates defining the platform area. These recesses may be quarter-circles, at which recesses the material of the respective plate is reduced to about 30–50 percent of the full plate thickness. A rigid pressure part, preferably a circular disk 5 to 8 mm thick, is fastened to the roadway by at least one screw, and affixes adjoining plates together and to the roadway. The disk shape corresponds to the recess area of four adjacent plates, when the quarter-circle recesses of the four plates are abutted. This form of assembly is quite simple, but is effective in that large connecting surfaces and high contact pressures are applied to the adjoining plates and it is not usually necessary to provide reinforcement under the recesses. Such reinforcements are nevertheless possible. When the speed bump is assembled, adjoining recesses of abutting plates form closed recesses, which are overlapped by the pressure plate. The recess space above the pressure plate can be filled by a plug while is in turn connected to the pressure plate by means of a screw and/or fastener.

In a preferred embodiment, the axis of the hole for connecting the pressure plate to the roadway is located at a point of intersection of lines defining the edges of adjoining plates. The screw is thereby located at the exact geometric corner of the plate. The individual plates can be further recessed along a line parallel to their corner edge, whereby it is not necessary to drill through the plates to accommodate the connecting screw, but when the plates are abutted, the recesses define a hole for the screw.

In an alternative embodiment, connection of abutting plates to one another as described above, and their mounting on a base layer, are accomplished using plug connectors, which are inserted edgewise into aligned recesses of the adjoining plates, the connectors having a drilled hole for the screw fastening the plates to the base. Such plug connectors are described in German patent application No. P 34 05 628, and the disclosure of such plug connectors as set forth in the German patent application is hereby incorporated.

Where an inclined ramp or speed bump is to be arranged transversely across a street, the ends will generally be defined by a curb. If no curv is provided, or if an inclined ramp is to define a traffic island, the structure may be bordered by ramp plates all around its outer edge. In this case, corner ramp plates may be provided, with a bottom surface of a triangular rather than rectangular shape, preferably an equal-sided right triangle. Such corner plates provide inclines for traversing the ramp structure even in a diagonal direction.

Other characteristics of the invention and advantages to be obtained are set forth hereinafter.

BRIEF DESCRIPTION OF THE DRAWINGS

There are shown in the drawings operating examples of the embodiments that are presently preferred. In the drawing:

FIG. 2 is a top view of a ramp plate and spacer plates according to FIG. 1.

FIG. 3 is a side view of the device of FIGS. 1 and 2.

FIG. 4 is a top view of an inclined ramp structure defining a traffic island.

FIG. 5 is a side view of the traffic island of FIG. 4.

DETAILED DESCRIPTION OF THE PREFERRED EMBODIMENTS

Figure 1:
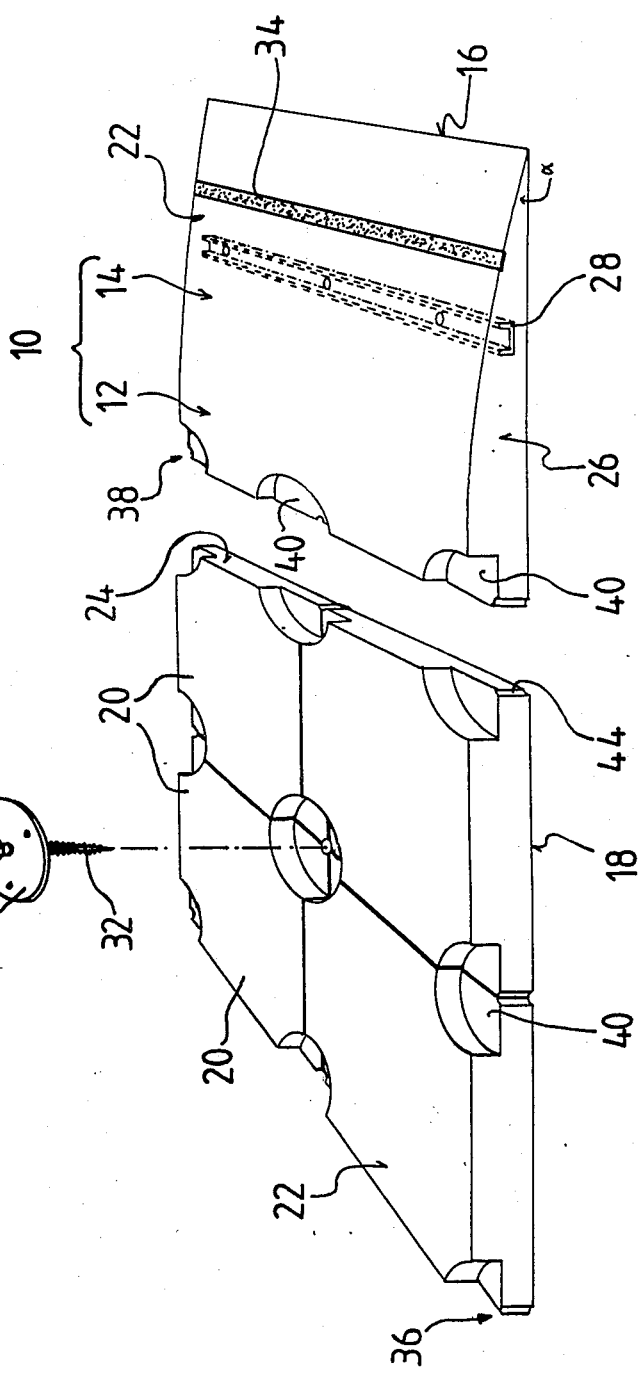
FIG. 1 is a perspective assembly view of a part of a ramp plate and four spacer plates.

In FIGS. 1-3, a first example of a dynamic inclined ramp speed bump is shown. The figure shows a section of such an inclined ramp during assembly. Only one ramp plate 10 is shown, however, at least another ramp plate presumably will be required to bring the level back to the roadway level at which leading edge 16 is disposed.

Ramp plate 10 is an integral plate including a platform section 12 with constant height and a wedge section 14, in one piece. The wedge section begins at a very sharp angle at leading edge 16 on lower surface 18 and leads up to the platform height of platform section 12. In FIGS. 1-3, a number of spacer plates 20 are also provided, extending the platform area begun at platform section 12 of ramp plate 10. The spacer plates have flat upper driving surfaces 22, and the thickness of the spacer plate corresponds to the height of platform section 12 of ramp 10. Most desired speed bumps and other inclined ramp structures can be readily assembled by connecting various configurations of ramp plates 10 and spacer plates 20.

Ramp elements 10 and platform elements 20 are described as "plates", and are intended to include relatively flat tabloid forms. Both plates are prismatic and have a generally constant cross section along their length. Spacer plates 20 have a square shape. The height of each of plates 10, 20 is substantially less than their width or length. In the operating example illustrated in the drawings, the platform height is approximately one fifth of the length of the spacer plates 20 along the driving direction. Ramp plates 10 are about twice the length (or width) of the spacer plates 20, measured in the driving direction. In the illustrated example, the length of ramp plate 10 in the driving direction is about 50 percent greater than the length of the spacer plates 20. Typical dimensions for the spacer plates 20 are 50 cm by 50 cm. Plates 10, 20 have narrow vertical surfaces 24, 26, at which the plates are abutted for assembly.

Plates 10, 20 are preferably made of recycled rubber. In the preferred embodiment, crimped or curly linear cut rubber pieces are used, being bonded together by a suitable media. Such a material is specified in West German Patentschrift No. 17 20 059 of the present applicant. The energy absorption of such a material made of recycled rubber pieces is 40 to 60 percent improved over a sand bed with standard granule size.

A rigid reinforcement strip 28 is embedded in the ramp plate 10 in the wedge section 14. Strip 28 is a U-shaped steel channel running approximately along the center of the wedge section 14 of ramp plate 10. Strip 28 extends along the complete length of ramp plate 10, being visible from the edge. It is also possible that strip 28 can be somewhat shorter than ramp plate 10, so that the edges are spaced from the edges, embedded in the resilient, preferably-recycled rubber material.

Reinforcement strip 28 has screw holes 30, for insertion of screws, for example wood screws, into the underlaying material. The same type of screw 32 as shown in FIG. 1 for fixing the pressure plates can be used in reinforcing strip 28. Above and below screw holes 30 in reinforcement strip 28, channels are cut for passage of the screws, the upper channel having a sufficient diameter to allow passage of the screw head, the head bearing on the channel 28. After the screw is inserted and tightened, the upper channel can be closed with a stopper (not shown).

The inclined ramp speed bump structure of this invention can be fastened to the under layment using only screws 32. Holes can be drilled into the ground before assembly, the ground usually being strong enough, in the case of roadways, i.e. made of concrete or asphalt. Dowels or like expanding fasteners can be placed in the holes to receive the screws, the dowels or the like being forced open when screw 32 is turned down, to thereby hold the screw in the concrete or asphalt. A force, for example, of 16 kilo-newtons (3600 pounds force) for screw 32 is obtained. The individual elements of the structure are held down by screws 32 in as complete surface contact as possible between their lower surfaces and the mounting surface.

In the embodiment shown in the drawings, the reinforcement strip 28 has a U-shaped profile with a width of about 5 cm, each edge of the channel having a height of about half the width. The reinforcement strip is made of material of thickness between 8 and 10 mm. Although prepared screw holes 30 are preferred for connecting channels 28 to the base layer, it is possible of course to drill additional screw holes 30, or to drill all the screw holes 30 during assembly. As shown in FIG. 1, the upper surface 22 of the wedge section 14, over which the vehicle wheels pass, curves smoothly into the platform surface 12 of the ramp plate. The incline runs smoothly into the flat part without a ridge. The length of the platform part of the ramp plate amounts to about one third of the total length of the ramp plate 10 in the direction of passage. The angle (alpha) defined by the leading or trailing edge is about 11 degrees.

Unlike reinforcement strip 28 in ramp plate 10, the spacer plates 20 are not reinforced in the example shown. However, it is possible to reinforce these also.

The exposed surface 22, especially that of the spacer plates 20, can be colored, for example black or white, and can be made to define zebra stripes. A reflective band is preferably vulcanized into the exposed surface 22, especially in the area of wedge 14 of ramp plate 10, defining a visible reflection area 34. Area 34 reflects light regardless of the angle of incidence, so that some light is reflected back to allow drivers to recognize the upcoming inclined ramp or speed bump. Especially at night, at least a part of the light of approaching headlights is reflected back by reflecting area 34.

The fastening down of plates 10, 20 is explained in detail below. Referring to FIGS. 1-3 and 4, the ramp plates 10 have recesses 40 on their corner sections 38, located on the side opposite from the leading edge 16. The recesses for each of four plates joined squarely are shaped like a quarter circle. Another recess, shaped like a semi-circle, is located at a junction remote from corners 38. The platform plates 20 and ramp plates 10 have similar quarter circle recesses at their corners 36. The recesses 40 are shaped such that the thickness of the material, as measured from the roadway surface, is reduced to 30 to 50 percent of the thickness up to the platform surface level. The recesses are formed in the upper sides; the lower sides remain flat.

When assembled as shown in FIG. 1, and including for example four spacer plates 20, and also as shown in FIG. 4 forming a complete traffic island, the individual recesses of abutting plates form a cup-shaped recess with a cylindrical shape. When plates 20 have been pushed together into their final assembly position, a pressure plate 42 is inserted, having a circular shape with an outside diameter corresponding to the inside diameter of the cup-shaped recess formed by the several aubtting plates. The pressure plates 42 have a concentric bore hole, through which a screw 32 (see FIG. 1) can be inserted. For easy insertion into the area below the recess the plates are further recessed at their corner edges 44, which correspond to the screw locations, such that when assembled, the plates 10, 20 define a bore hole for easy passage of screw 32 into the underlying material.

An installed incline ramp or speed bump, as shown in FIG. 4 and 5, can be finished all around to form a traffic island. The spacer plates 20 are each clamped on their corners together with ramp plates 10. It may also be possible in some circumstances to clamp the plates to a curb stone or the like. The spacer plates are surrounded by a frame of ramp plates, which are stationary and are themselves connected to the underlying surface. Pressure plates 42 have a diameter which is about one third of the length of the spacer plates in the driving direction. In a preferred embodiment, the pressure plates 42 and 20 cm in diameter, and have a thickness of about 8 mm.

The space remaining above the installed pressure plate 42 up to the level of the platform driving surface 42, is filled with a plug 46, which can be connected to the pressure plate 42. In the example shown, the pressure plate 42 has three internal threads into which screws can be inserted, to support plug 46 on plate 42. The plug is preferably reinforced.

For the inclined ramp structure shaped like a traffic island as shown in FIGS. 4 and 5, corner ramp plates 48 are used in addition to the components discussed above. These corner ramp plates 48 are essentially the same as ramp plates 10, but in plan view are shaped as a right triangle with equal sides. Corner ramp plates 48 have only one recess 40 on their inner corner edge 44, at the right angle. The leading edge 16 and reinforcing strip 28 are aligned at 45 degrees to either edge surface 26. The curve of the inclined surface 22 is matched to the adjoining ramp plates 10 such that there is no ridge at the transition.

FIG. 4 shows the grid formation defined by the fastening positions of screws 32 and the covering plugs. Screws 32 are covered by plugs 46 in FIG. 4, but the junction lines of the individual plates 10, 20, 48 are shown. In each case, the holes for screws 32 are located at the intersection of lines at which the respective plates are joined along their abutting edge surfaces 24, 26.

Figure 6:
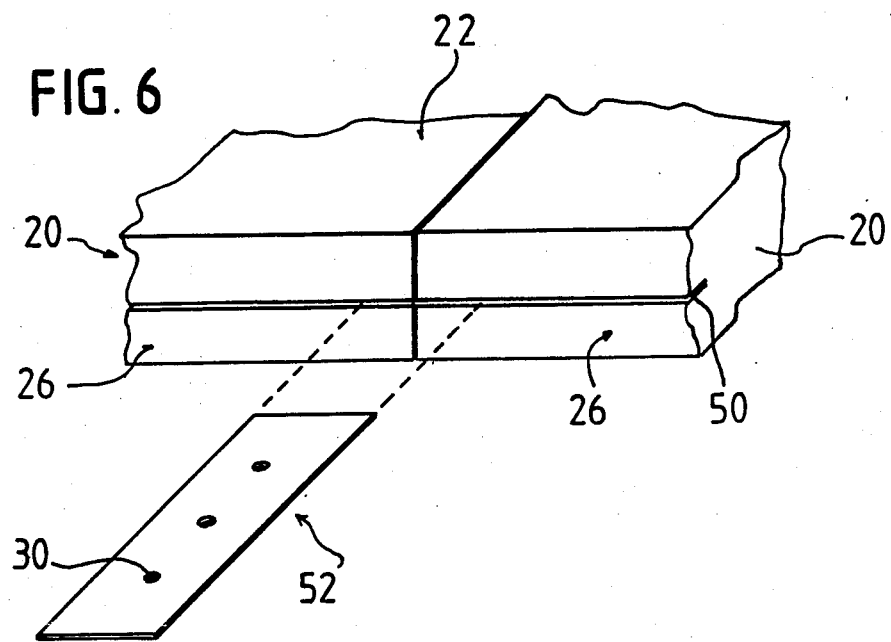
FIG. 6 is a perspective view of a connection of two plates using a connector plug.

FIG. 6 shows another type of connection for affixing the ramp plates 12 or spacer plates 20. The connection part used therein is similar to that of Offenlegungsschrift No. 34 05 628 to the applicant. In this embodiment, horizontal relatively-deep channels 50 are provided in the edge surfaces 24, 26 of the plates. Connector 52 is inserted therein such that the adjoining plates 10, 20, 48 are thereby connected. At the junction lines between the plates, 10, 20, 48, the connector 52 has at least one bore hole for receiving a screw, similar to the manner described above. In other respects, the connector 52 corresponds to pressure plate 42, however, no covering plug is needed. Other insertable connectors, especially plug connectors which can be inserted into pockets in the edges of the connected plates, can be used in lieu of the channels formed as shown in FIG. 6. Offenlegungsschrift No. 34 05 628 shows such a pocket arrangement.

The building block system shown and described is also useful for constructing structures that are hard or impossible to drive over, for example to build non-passable traffic islands. Instead of ramp plates 10, a rounded curb stone (e.g. quarter round in cross section) can be reinforced on the inside with a reinforcement strip 28, and connected in place. The connection of such a curb stone can be accomplished similar to that described above. A more pronounced bend makes passage more difficult, even though energy is absorbed. The outer reinforced edge section framing the spacer blocks functions as above.

It has proven advantageous to provide flattened disc-like lentil-shaped projections 54 on the flattened area defined by recess 40. These are shown at the bottom of FIG. 3. These projections more securely attach the disc-shaped pressure plate 40 to each of the adjoining plates to be connected, even in view of manufacturing tolerances and assembly accuracy.

In a preferred embodiment as shown in FIG. 3, projections 54 are round when viewed in plan. Several projections 54 are provided on each recess 40. An alternative or additional attachment feature, as shown in FIG. 2, can be had by providing an outer edge 56 on pressure plate 42, protruding toward the bottom. Edge 56 engages at the edges of flat recesses 40, tending to attach pressure plate 42 more securely.

The invention having been disclosed, additional variations will now occur to persons skilled in the art. Reference should be made to the appended claims rather than that foregoing specification as indicating the true scope of the invention.

What is claimed is:

1. A modular inclined ramp structure for mounting on a roadway surface, comprising:
   a plurality of solid ramp plates, each having a flat platform section, a sloping section leading to the flat platform section and a rounded transitional section therebetween, each ramp plate being made of resilient, energy-absorbing material which deforms elastically when driven over and each ramp plate having a reinforcing and fixing strip extending along the sloping section, running parallel to a lowermost edge of the sloping section, each ramp plate being fixable to the roadway surface by means inserted through each ramp plate along the reinforcing and fixing strip;
   reflecting means embedded in the sloping section of each ramp plate;
   a plurality of solid spacer plates, each having a flat upper surface aligned with the platform sections of the ramp plates and being abuttable against any ramp plate at a side of the ramp plate opposite the lowermost edge and abuttable against other spacer plates along any edge, the ramp and spacer plates having blunt contact surfaces for abutting one another;
   a plurality of inserts for securing the ramp and spacer plates to one another, each of the ramp and spacer plates having recesses at corners of the abuttable contact surfaces, the recesses of abutted ramp and spacer plates forming composite recesses for receiving the inserts; and,
   threaded means mountable through the inserts for attachment into the roadway surface, whereby a plurality of inclined ramp structures may be formed by interconnection of different numbers of the ramp plates and the spacer plates in different geometrical configurations and each lowermost edge and part of each sloping section adjacent each lowermost edge is substantially prevented from bending and deflecting upwardly when driven over.

2. The ramp structure of claim 1, wherein the sloping section of the ramp plate extends between 10 and 80 percent of a length of the ramp plate in a direction of passage over the ramp plate.

3. The ramp structure according to claim 2, wherein the sloping section extends about half a length of the ramp plate.

4. The ramp structure of claim 1, wherein the sloping section of the ramp plate defines an angle between 5 and 15 degrees to the roadway.

5. The ramp structure of claim 4, wherein the ramp plate has an angle between 7 and 11 degrees.

6. The ramp structure of claim 1, wherein the threaded means are inserted through lines of intersection defining boundaries of abutted ones of the ramp plates and spacer plates.

7. The ramp structure of claim 1, wherein abutting edges of the ramp and spacer plates have pockets for receiving the inserts, the inserts being plug connectors with a bore hole for receiving a screw, the inserts extending into abutting edges of adjoined plates in the pockets.

8. The ramp structure of claim 7, wherein the pockets define channels running along edges of the abutting plates.

9. The ramp structure according to claim 1, wherein the ramp plates are about twice as long as the spacer plates in a direction of travel over the ramp.

10. The ramp structure of claim 9, wherein the spacer plates are about 50 cm by 50 cm square.

11. The ramp structure of claim 1, wherein the reflecting means is defined by reflective foil embedded in a surface of the ramp plate.

12. The ramp structure of claim 1, wherein the recesses are part-circle recesses in adjacent abutted plates, the part-circle recesses together defining a circle and the connector being a circular disc.

13. The ramp structure of claim 12, wherein the disc is 5 to 8 mm thick and has a bore hole for receiving a screw, the disc corresponding to the recess surface of abutting plates.

14. The ramp structure of claim 1, wherein the recesses have upward-directed projections on surfaces thereof engaged by the inserts.

15. The ramp structure of claim 1, wherein the inserts have downwardly-directed edges protruding into the abutting plates.

16. The ramp structure of claim 1, wherein the ramp plates and the spacer plates comprise recycled rubber, formed by linear crimp cut rubber pieces molded together.

17. An inclined ramp structure for mounting on a roadway surface, comprising:
   at least two ramp plates, each having a platform section, a sloping section leading from a lowermost edge to the platform section and a rounded transition section joining the platform and sloping sections, and each having a blunt contact surface opposite the lowermost edge, each ramp plate being made of resilient, energy-absorbing material which deforms elastically when driven over;
   a reinforcement and affixation strip extending along the sloping section of each ramp plate and running parallel to the lowermost edge of the sloping section, each ramp plate being fixable to the roadway surface by means inserted through each ramp plate along the reinforcement strip; and,
   at least one insert for securing the ramp plates to one another along the blunt contact surfaces, each of the ramp plates having recesses at corners of the contact surfaces, the recesses of abutted ramp plates forming composite recesses for receiving the inserts, whereby the lowermost edge and part of each sloping section adjacent to the lowermost edge is substantially prevented from bending and deflecting upwardly when driven over.

18. The ramp structure of claim 17, further comprising:
   at least one spacer plate having a flat upper surface aligned with the platform sections of the ramp plates and being abuttable against the contact surface of any ramp plate; and, means mountable through the inserted means for attachment into the roadway surface.

19. The ramp structure of claim 17, further comprising reflecting means embedded in the sloping section of each ramp plate.

20. A modular, inclined ramp system for mounting on a roadway surface, comprising:

a plurality of ramp plates, each of the ramp plates having a platform section, a sloping section leading from a lowermost edge to the platform section and a rounded transition section joining the platform and sloping sections, and each having a blunt contact surface opposite the lowermost edge, each ramp plate being made of resilient energy-absorbing material which deforms elastically when driven over;

a reinforcement and affixation strip extending along the sloping section of each ramp plate and running parallel to the lowermost edge of the sloping section, each ramp plate being affixable to the roadway surface by means inserted through each ramp plate along the reinforcement strip;

a plurality of spacer plates, each spacer plate having a flat upper surface aligned with the platform sections of the ramp plates and being abuttable against the contact surface of any ramp plate;

a plurality of inserts for securing the ramp and spacer plates to one another along the blunt contact surface, each of the ramp and spacer plates having recesses at corners of the contact surfaces, the recesses of abutted ramp and spacer plates forming composite recesses for receiving the inserts, whereby the lowermost edge and part of each sloping section adjacent to the lowermost edge is substantially prevented from bending and deflecting upwardly when driven over; and, each of the spacer plates being abuttable against the contact surface of any ramp plate and abuttable against other spacer plates along any edge, abutted ramp and spacer plates being secured to one another by the inserts, whereby a plurality of inclined ramp structures may be formed by interconnection of different numbers of the ramp plates and the spacer plates in different geometrical configurations.

* * * * *